US008965435B2

(12) United States Patent
Nobukiyo et al.

(10) Patent No.: US 8,965,435 B2
(45) Date of Patent: Feb. 24, 2015

(54) WIRELESS RESOURCE SETTING METHOD, WIRELESS COMMUNICATION SYSTEM, WIRELESS BASE STATION, AND PROGRAM

(75) Inventors: Takahiro Nobukiyo, Tokyo (JP); Naoto Ishii, Tokyo (JP); Daisuke Ohta, Tokyo (JP)

(73) Assignee: NEC Corporation, Tokyo (JP)

( * ) Notice: Subject to any disclaimer, the term of this patent is extended or adjusted under 35 U.S.C. 154(b) by 170 days.

(21) Appl. No.: 13/697,487

(22) PCT Filed: May 18, 2011

(86) PCT No.: PCT/JP2011/061401
§ 371 (c)(1),
(2), (4) Date: Nov. 12, 2012

(87) PCT Pub. No.: WO2011/148836
PCT Pub. Date: Dec. 1, 2011

(65) Prior Publication Data
US 2013/0072246 A1  Mar. 21, 2013

(30) Foreign Application Priority Data

May 28, 2010  (JP) .................................. 2010-122433

(51) Int. Cl.
*H04W 72/00* (2009.01)
*H04B 7/00* (2006.01)
(Continued)

(52) U.S. Cl.
CPC ............ *H04W 72/04* (2013.01); *H04W 52/267* (2013.01); *H04L 1/0003* (2013.01);
(Continued)

(58) Field of Classification Search
CPC .................................................. H04W 24/10
USPC ........................ 455/509, 507, 450, 452.1, 560
See application file for complete search history.

(56) References Cited

U.S. PATENT DOCUMENTS

2004/0097238 A1  5/2004  Hwang et al.
2006/0050742 A1*  3/2006  Grandhi et al. ............... 370/506
(Continued)

FOREIGN PATENT DOCUMENTS

CN  101286786 A  10/2008
CN  101690291 A  3/2010
(Continued)

OTHER PUBLICATIONS

3GPP TSG RAN E-UTRA and E-UTRAN Overall description, Jun. 2009, p. 86, 3GPP TS 36.300 V8.9.0.
(Continued)

*Primary Examiner* — Tilahun B Gesesse
(74) *Attorney, Agent, or Firm* — Sughrue Mion, PLLC

(57) ABSTRACT

A wireless base station (100) calculates a first transmission rate when performing transmission to a wireless terminal with communication path quality by a first transmission power in a first candidate band selected as a candidate from first wireless bands including a neighboring priority band, calculates a second transmission rate when performing transmission to the wireless terminal (200) with the communication path quality by a second transmission power in a second candidate band selected as a candidate from second wireless bands that do not include the neighboring priority band, and sets, out of a first wireless resource including the first transmission power and the first candidate band and a second wireless resource including the second transmission power and the second candidate band, a wireless resource for a higher transmission rate obtained by the calculation as a wireless resource allocatable to the wireless terminal (200). It is therefore possible to maximize the throughput of the wireless terminal existing in the local station communication area while implementing suppression of interference to the neighboring cell.

9 Claims, 12 Drawing Sheets

(51) Int. Cl.
*H04M 1/00* (2006.01)
*H04W 72/04* (2009.01)
*H04W 52/26* (2009.01)
*H04L 1/00* (2006.01)
*H04L 1/20* (2006.01)
*H04W 28/06* (2009.01)
*H04W 28/22* (2009.01)
*H04W 72/02* (2009.01)
*H04W 52/36* (2009.01)

(52) U.S. Cl.
CPC ............ H04L1/0009 (2013.01); H04L 1/0026 (2013.01); H04L 1/20 (2013.01); *H04W 28/06* (2013.01); *H04W 28/22* (2013.01); *H04W 72/02* (2013.01); *H04W 52/36* (2013.01)
USPC ......... 455/509; 455/507; 455/450; 455/452.2

(56) References Cited

U.S. PATENT DOCUMENTS

2007/0225014 A1* 9/2007 Kurose ....................... 455/452.2
2007/0230397 A1* 10/2007 Sakata ........................... 370/329
2012/0002631 A1* 1/2012 Nishio et al. .................. 370/329

FOREIGN PATENT DOCUMENTS

EP 1594260 A1 11/2005
JP 2004-159345 A 6/2004

OTHER PUBLICATIONS

"Performance Evaluation of Uplink Interface Avoidance Techniques", Freescale Semiconductor, Jun. 27-30, 2006, 3GPP TSG RAN WG1 LTE Ad Hoc R1-061928.
3GPP TSG RAN EUTRAN X2AP, Jun. 2009, p. 27, 48-49, 3GPP TS 36.423 V8.6.0.
3GPP TSG RAN EUTRAN Physical Layer Procedures, Sep. 2009, p. 25-32, 3GPP TS 36.213 V8.8.0.
Communication dated Sep. 30, 2014 from the State Intellectual Property Office of the People's Republic of China in counterpart application No. 201180026522.3.
Ning et al, "Study of 3GPP LTE Inter cell Interference Coordination," Mar. 21, 2007, 3GPP LTE.

* cited by examiner

FIG.10A
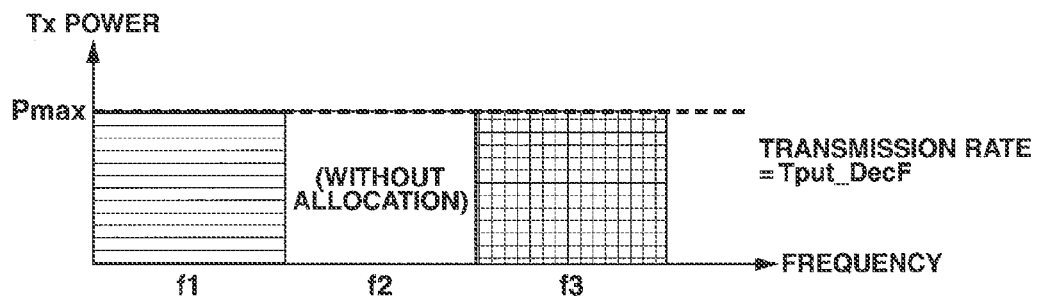
FIG.10B
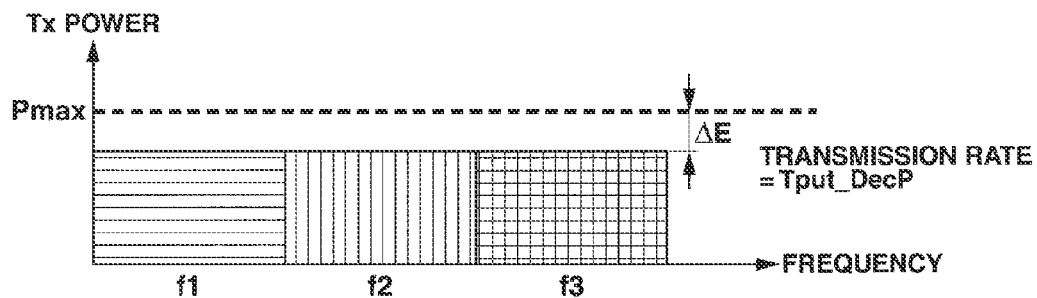
FIG.11

WIRELESS RESOURCE SETTING METHOD, WIRELESS COMMUNICATION SYSTEM, WIRELESS BASE STATION, AND PROGRAM

CROSS REFERENCE TO RELATED APPLICATIONS

This application is a National Stage of International Application No. PCT/JP2011/061401 filed May 18, 2011, claiming priority based on Japanese Patent Application No. 2010-122433 filed May 28, 2010, the contents of all of which are incorporated herein by reference in their entirety.

TECHNICAL FIELD

The present invention relates to a wireless control technique and, more particularly, to a wireless resource setting technique of setting a wireless resource allocatable to wireless communication.

BACKGROUND ART

A cellular environment such as LTE (Long Term Evolution) standardized in 3GPP (3rd Generation Partnership Project) assumes to arrange a plurality of wireless base stations. Each wireless base station communicates with a wireless terminal in the local station communication area. This communication area is called a cell. The cell can be divided into a plurality of areas by imparting directivity to the antenna. Each divided area is called a sector cell. A cell will indicate a sector cell hereinafter.

In the LTE, a single wireless band (to be referred to as a band hereinafter) is generally used between the cells. Hence, each cell receives strong interference (to be referred to as a neighboring cell interference hereinafter) from a neighboring cell independently of whether the link is the up link or down link. In, for example, a down link, the communication path quality does not degrade for a wireless terminal near the wireless base station because the level difference between the desired signal received by the wireless base station and the interference signal from a neighboring cell is large. However, if signals are simultaneously transmitted to wireless terminals near a cell boundary using a single band in neighboring cells, the communication quality largely degrades because the level difference between the desired signal and the interference signal from a neighboring cell is small. This also applies to an up link.

In the LTE, ICIC (Inter-cell Interference Coordination) is expected to be applied as a related technique of solving the problem of neighboring cell interference (see, for example, non-patent literature 1). Non-patent literature 1 describes that the ICIC aims at controlling interference between neighboring cells, and information such as a resource use state or traffic load of another cell needs to be taken into consideration. One method of implementing the ICIC is FFR (Frequency Fractional Reuse).

The basic operation of FFR will be described. First, a priority band is set for each cell such that the band changes between neighboring cells. The wireless terminal reports communication path quality information to the wireless base station. The wireless base station determines using the communication path quality information whether the wireless terminal is a wireless terminal (to be referred to as a center wireless terminal hereinafter) little affected by the neighboring cell interference or a wireless terminal (to be referred to as an edge wireless terminal hereinafter) largely affected by the neighboring cell interference. Upon determining that the wireless terminal is an edge wireless terminal, the allocatable band is restricted to the priority band of the local cell. For a center wireless terminal, the allocatable band is not restricted. A scheduler allocates a wireless resource from allocatable bands to each wireless terminal in accordance with the communication path quality (see, for example, non-patent literature 2). Setting the priority bands such that they do not overlap between the neighboring cells allows to suppress the neighboring cell interference. For this reason, the throughput of the edge wireless terminal is expected to be higher as the communication path quality of the priority band is improved.

The priority band may dynamically be set. As a method of notifying the priority band between wireless base stations, load information is defined (see, for example, non-patent literature 3). A down link can be notified by RNTP (Relative Narrowband Tx Power), and an up link can be notified by HII (High Interference Indication). Notification information by RNTP or HII is created for each PRB (Physical Resource Block) number that is the minimum user channel band allocation unit. For example, for the PRBs of a priority band, RNTP is set to 1. Non-patent literature 3 describes that "1 indicates that the transmission power is not guaranteed", and a PRB number that does not guarantee considering interference to the neighboring cell is notified.

FIG. 14 is an explanatory view showing a wireless resource setting operation in the related technique. FIG. 15 shows an example of priority band allocation. FIG. 16A shows an example of wireless resources allocatable to a wireless terminal UE1. FIG. 16B shows an example of wireless resources allocatable to a wireless terminal UE2.

Referring to FIG. 14, a wireless base station BS1 manages a cell C11, a wireless base station BS2 manages a cell C21, and a wireless base station BS3 manages a cell C31 as the local station communication area. Although each of the wireless base stations BS1, BS2, and BS3 can manage a plurality of cells, only one cell is illustrated for the sake of simplicity. The circles represent the effective ranges of radio waves based on the directivity of the antenna for the wireless base stations BS1, BS2, and BS3. Cell boundaries exist in the ranges where the circles overlap.

In the example shown in FIG. 14, two wireless terminals exist. Of these, the wireless terminal UE1 belongs to the cell C11. The wireless terminal UE1 is an edge wireless terminal that has the cell C31 as a neighboring cell. The wireless terminal UE2 is a center wireless terminal belonging to the cell C31. In LTE, the bands to be allocated to a single wireless terminal have an identical transmission power. As shown in FIG. 15, the allocatable bands are divided into three bands f1, f2, and f3, which are set as the priority bands of the cells C11, C21, and C31, respectively. Each priority band is formed from three PRBs.

In FIG. 14, since the edge wireless terminal UE1 exists in the cell C11, the wireless base station BS1 notifies the wireless base station BS3 of the neighboring cell C31 of RNTP=1 concerning the band f1. At this time, since no RNTP is received in the cell C11, neither the band nor the transmission power is restricted for the edge wireless terminal UE1, as shown in FIG. 16A. On the other hand, the wireless base station BS3 that has received the RNTP notification decreases the transmission power of the band f1 of the cell C11 to suppress interference of the cell C31 on the neighboring cell. For this reason, the wireless terminal UE2 decreases the transmission power by ΔE, and all bands are allocatable.

RELATED ART LITERATURE

Patent Literature

Non-Patent Literature 1: 3GPP TS 36.300 V8.9.0 (2009-06), 3GPP TSG RAN E-UTRA and E-UTRAN Overall description, pp. 86

Non-Patent Literature 2: 3GPP TSG RAN R1-06928, PERFORMANCE EVALUATION OF UPLINK INTERFERENCE AVOIDANCE TECHNIQUES, FREESCALE SEMICONDUCTOR Non-Patent Literature 3: 3GPP TS 36.423 V8.6.0 (2009-06), 3GPP TSG RAN EUTRAN X2AP, PP27, 48-49

Non-Patent Literature 4: 3GPP TS 36.213 V8.8.0 (2009-09), 3GPP TSG RAN EUTRAN PHYSICAL LAYER PROCEDURES, PP 25-26, 27-32

DISCLOSURE OF INVENTION

Problem to be Solved by the Invention

In these related arts, the throughput of the wireless terminal greatly degrades.

The reason for this will be described using a down link as an example. FIG. 17 is an explanatory view showing a wireless resource setting operation after a time has elapsed from FIG. 14. Referring to FIG. 17, a wireless terminal UE3 occurs in the cell C21 from the state shown in FIG. 14. The wireless terminal UE3 is assumed to be an edge wireless terminal next to the cell C11.

First, the wireless base station BS2 notifies the wireless base station BS1 of the cell C11 as a neighboring cell of RNTP=1 concerning the band f2. Upon receiving the RNTP notification, the wireless base station BS1 restricts the allocatable band f2 to the edge wireless terminal UE1 for the cell C11. FIG. 18 shows an example of setting of wireless resources allocatable to the wireless terminal UE1 (after RNTP reception).

However, for the edge wireless terminal UE1, the level of interference from the cell C21 remains low because the cell C21 is not a neighboring cell. In addition, since the cell C31 is already notified of RNTP, any further decrease in the interference to the edge wireless terminal UE1 cannot be expected.

Hence, in the above-described case, the channel quality of the priority band f1 of the edge wireless terminal UE1 does not improve, as shown in FIG. 18. Only the band is restricted, and the throughput of the edge wireless terminal UE1 largely degrades. The same problem arises in an up link as well if the transmission power and the band are changed in accordance with the setting of the priority band of the neighboring cell.

The present invention has been made to solve the above-described problems, and has as its exemplary object to provide a wireless resource setting technique capable of maximizing the throughput of a wireless terminal existing in a local station communication area while implementing suppression of interference to a neighboring cell.

Means of Solution to the Problem

In order to achieve the above-described exemplary object, a wireless resource setting method according to the present invention includes the priority band acquisition step of acquiring, based on a notification from a neighboring wireless base station in a neighboring communication area next to a local station communication area of a wireless base station, a neighboring priority band preferentially used in the neighboring communication area, the communication path quality acquisition step of acquiring, based on a notification from a wireless terminal existing in the local station communication area, communication path quality concerning wireless communication of the wireless terminal with the wireless base station, the transmission rate calculation step of calculating a first transmission rate when performing transmission to the wireless terminal with the communication path quality by a first transmission power in a first candidate band selected as a candidate from first wireless bands including the neighboring priority band out of wireless bands usable in the local station communication area and calculating a second transmission rate when performing transmission to the wireless terminal with the communication path quality by a second transmission power in a second candidate band selected as a candidate from second wireless bands that do not include the neighboring priority band out of the wireless bands usable in the local station communication area, and the wireless resource setting step of setting, out of a first wireless resource including the first transmission power and the first candidate band and a second wireless resource including the second transmission power and the second candidate band, a wireless resource for a higher transmission rate obtained by the calculation as a wireless resource allocatable to the wireless terminal.

A wireless communication system according to the present invention includes a wireless base station and a wireless terminal existing in a local station communication area of the wireless base station, the wireless base station including a priority band acquisition unit that acquires, based on a notification from a neighboring wireless base station in a neighboring communication area next to the local station communication area, a neighboring priority band preferentially used in the neighboring communication area, a communication path quality acquisition unit that acquires, based on a notification from the wireless terminal, communication path quality concerning wireless communication of the wireless terminal with the wireless base station, a transmission rate calculation unit that calculates a first transmission rate when performing transmission to the wireless terminal with the communication path quality by a first transmission power in a first candidate band selected as a candidate from first wireless bands including the neighboring priority band out of wireless bands usable in the local station communication area and calculates a second transmission rate when performing transmission to the wireless terminal with the communication path quality by a second transmission power in a second candidate band selected as a candidate from second wireless bands that do not include the neighboring priority band out of the wireless bands usable in the local station communication area, and a wireless resource setting unit that sets, out of a first wireless resource including the first transmission power and the first candidate band and a second wireless resource including the second transmission power and the second candidate band, a wireless resource for a higher transmission rate obtained by the calculation as a wireless resource allocatable to the wireless terminal.

A wireless base station according to the present invention includes a priority band acquisition unit that acquires, based on a notification from a neighboring wireless base station in a neighboring communication area next to a local station communication area of the wireless base station, a neighboring priority band preferentially used in the neighboring communication area, a communication path quality acquisition unit that acquires, based on a notification from a wireless terminal existing in the local station communication area, communication path quality concerning wireless communication of the wireless terminal with the wireless base station, a transmission rate calculation unit that calculates a first transmission rate when performing transmission to the wireless terminal with the communication path quality by a first transmission power in a first candidate band selected as a candidate from first wireless bands including the neighboring priority band out of wireless bands usable in the local station communication area and calculates a second transmission rate when performing transmission to the wireless terminal with the communication path quality by a second transmission power in a second candidate band selected as a candidate from second wireless bands that do not include the neighboring priority band out of the wireless bands usable in the local station communication area, and a wireless resource setting unit that sets, out of a first wireless resource including the first transmission power and the first candidate band and a second wireless resource including the second transmission power and the second candidate band, a wireless resource for a higher transmission rate obtained by the calculation as a wireless resource allocatable to the wireless terminal.

A program according to the present invention causes a computer to function as each unit included in the above-described wireless base station.

Effect of the Invention

According to the present invention, it is possible to compare a first transmission rate obtained when using a first candidate band including a neighboring priority band with a second transmission rate obtained when using a second candidate band that does not include the neighboring priority band and set a combination of a transmission power and a communication band for a higher transmission rate as a wireless resource allocatable to a wireless terminal. It is therefore possible to maximize the throughput of a wireless terminal existing in a local station communication area while implementing suppression of interference to a neighboring cell.

BRIEF DESCRIPTION OF DRAWINGS

FIG. 10A is a view showing an example of wireless resource setting (Tput_DecF);
FIG. 10B is a view showing an example of wireless resource setting (Tput_DecP);
FIG. 11 is a view showing an example of wireless resource allocation used for transmission rate calculation.

BEST MODE FOR CARRYING OUT THE INVENTION

[Characteristic Feature of Present Invention]

A characteristic feature of a wireless communication system according to the present invention will be described first with reference to FIG. 1.

Figure 1:
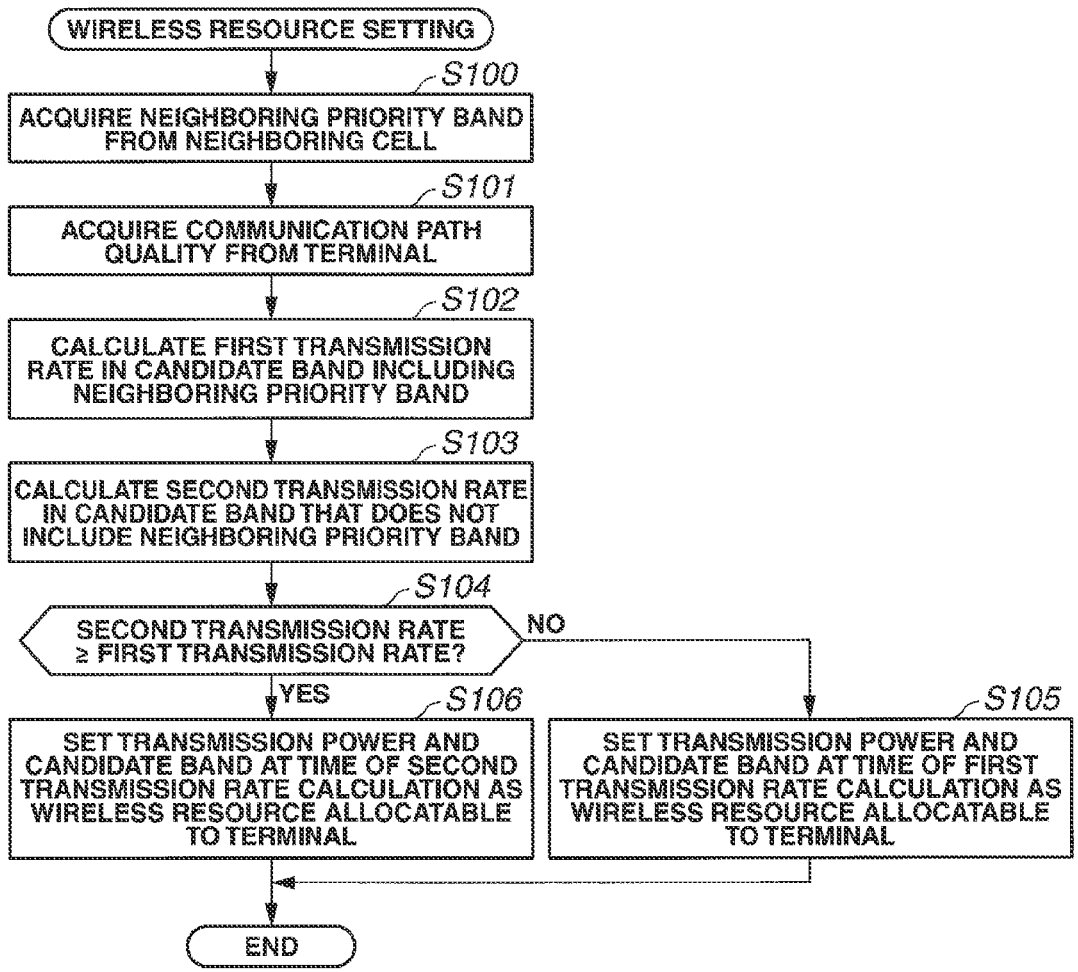
FIG. 1 is a flowchart showing wireless resource setting processing representing a characteristic feature of the present invention.

A wireless base station included in the wireless communication system executes wireless resource setting processing shown in FIG. 1 when setting a wireless resource allocatable to a wireless terminal existing in the local station communication area.

First, the wireless base station receives a notification from a neighboring wireless base station in a neighboring communication area next to the local station communication area, thereby acquiring a neighboring priority band to be preferentially used in the neighboring communication area (step S100).

Next, the wireless base station receives a notification from a wireless terminal, thereby acquiring communication path quality concerning wireless communication of the wireless terminal with the wireless base station (step S101).

The wireless base station calculates a first transmission rate when performing transmission to the wireless terminal with the communication path quality by a first transmission power in a first candidate band selected as a candidate from first wireless bands including the neighboring priority band out of wireless bands usable in the local station communication area (step S102).

Additionally, the wireless base station calculates a second transmission rate when performing transmission to the wireless terminal with the communication path quality by a second transmission power in a second candidate band selected as a candidate from second wireless bands that do not include the neighboring priority band out of the wireless bands usable in the local station communication area (step S103).

After that, the wireless base station compares the first transmission rate with the second transmission rate (step S104). If the first transmission rate is higher than the second transmission rate (NO in step S104), the first transmission power and the first candidate band are set in the wireless terminal as a wireless resource (step S105), and the series of wireless resource setting processes ends.

On the other hand, if the first transmission rate is equal to or lower than the second transmission rate (YES in step S104), the second transmission power and the second candidate band are set in the wireless terminal as a wireless resource (step S106), and the series of wireless resource setting processes ends.

Hence, it is possible to compare the first transmission rate obtained when using the first candidate band including the neighboring priority band with the second transmission rate obtained when using the second candidate band that does not include the neighboring priority band and set a combination of the transmission power and the communication band for a higher transmission rate as a wireless resource allocatable to the wireless terminal. It is therefore possible to maximize the throughput of the wireless terminal existing in the local station communication area while implementing suppression of interference to the neighboring cell.

The exemplary embodiments of the present invention will be described next with reference to the accompanying drawings.

[First Exemplary Embodiment]

A wireless communication system according to the first exemplary embodiment of the present invention will be described first with reference to FIGS. 2 to 4.

A wireless communication system 1 is formed from a plurality of wireless base stations 100 and a plurality of wireless terminals 200 existing in the local station communication areas of the wireless base stations 100.

The wireless base station 100 is a wireless communication apparatus that performs wireless communication with the wireless terminal 200 existing in the local station communication area, and is connected to a communication network (not shown) via a wire circuit.

Assume that a cell arrangement established by LTE is applied to the wireless communication system 1, and the band allocation unit will be referred to as an RB (Resource Block). This exemplary embodiment will be explained by exemplifying a down link of LTE.

[Arrangement of Wireless Base Station]

The arrangement of the wireless communication system 1 according to this exemplary embodiment will be described first in detail with reference to FIG. 2.

The wireless base station 100 includes a base station operation unit 101, a wireless terminal determination unit 102, a priority band setting unit 103, a wireless resource setting unit 104, a scheduler 105, a transmission buffer 106, a reference signal generation unit 107, and a neighboring cell information notification unit 108 as main functional units.

Figure 2:
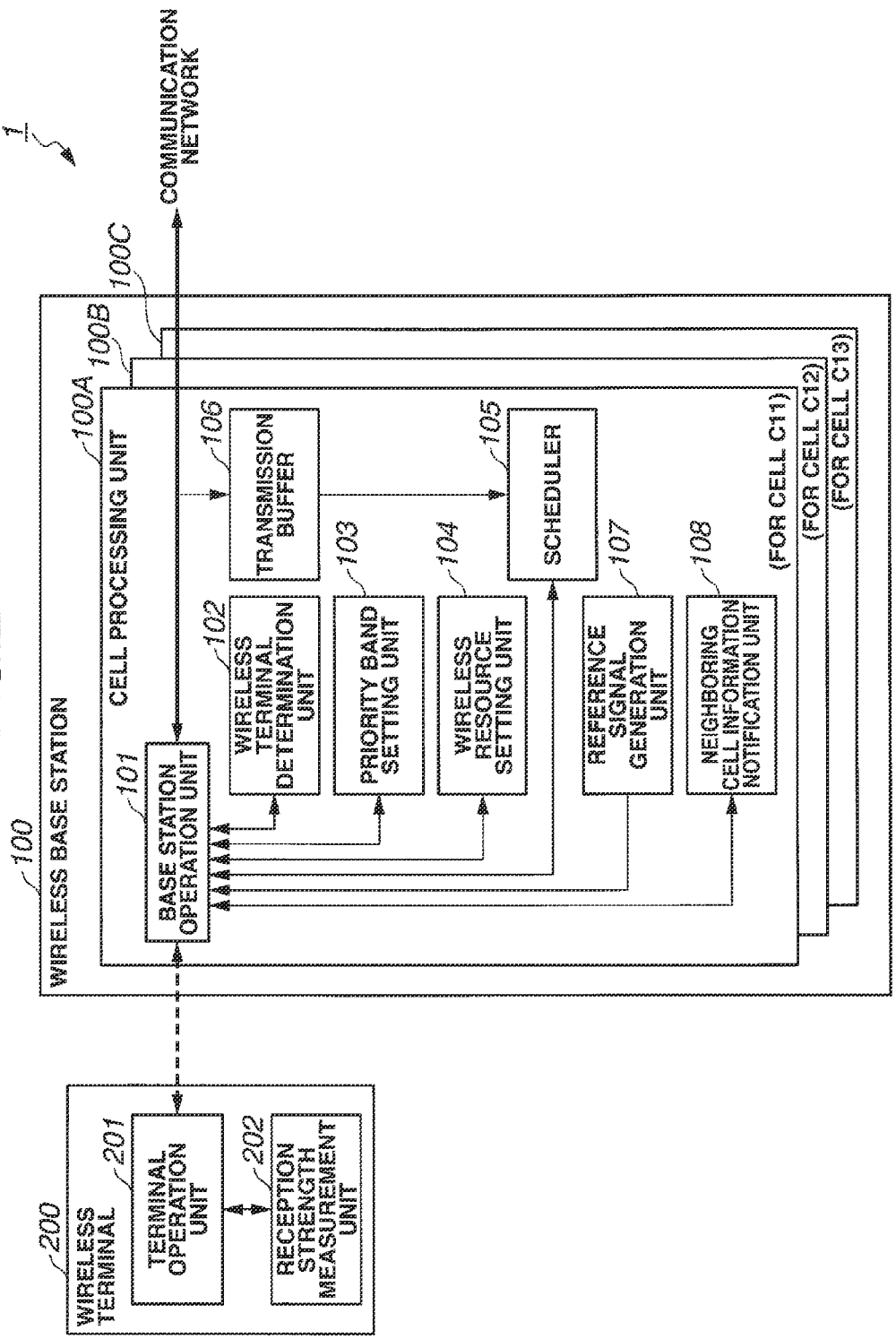
FIG. 2 is a block diagram showing the arrangement of a wireless communication system according to the first exemplary embodiment.

In the example shown in FIG. 2, the wireless base station 100 manages three cells C11, C12, and C13 as the local station communication area. The base station operation unit 101, the wireless terminal determination unit 102, the priority band setting unit 103, the wireless resource setting unit 104, the scheduler 105, the transmission buffer 106, the reference signal generation unit 107, and the neighboring cell information notification unit 108 described above are prepared for each of cell processing units 100A, 100B, and 100C corresponding to the cells C11, C12, and C13.

The base station operation unit 101 has a function (corresponding to step S100 in FIG. 1) of performing data communication with a neighboring wireless base station connected via the communication network to exchange various kinds of information such as information about the priority band to be preferentially used in the local cell (local station communication area) and the neighboring cell (neighboring communication area), and a function (corresponding to step S101 in FIG. 1) of performing data communication with the wireless terminal 200 to acquire various kinds of information such as a reference signal received power and communication path quality measured by the wireless terminal 200. In addition, the base station operation unit 101 has the same functions as those of a wireless base station generally used in a wireless communication system. The arrangement and operation are known, and a description thereof will be omitted.

The wireless terminal determination unit 102 has a function of determining, based on the RSRP (Reference Signal Received Power) of the wireless terminal 200 acquired by the base station operation unit 101, whether the wireless terminal is a wireless terminal (to be referred to as an edge wireless terminal hereinafter) largely affected by neighboring cell interference or a less affected wireless terminal (to be referred to as a center wireless terminal hereinafter). The determination result is sent to the priority band setting unit 103 and the wireless resource setting unit 104 via the base station operation unit 101.

The priority band setting unit 103 has a function of setting the priority band of the local cell, a function of notifying the neighboring cell of the priority band of the local cell, and a function of holding priority band information representing the neighboring priority band of the neighboring cell acquired by the base station operation unit 101.

The wireless resource setting unit 104 has a function (corresponding to steps S102 to S106 in FIG. 1) of selecting (deciding) a transmission power $P(u)$ [dBm] and a band $f(u)$ to be used in wireless communication as a wireless resource allocatable to a wireless terminal u (200) based on the presence/absence of an RNTP notification from the neighboring cell and the transmission rate calculation result, and setting the wireless resource in a storage unit (not shown).

The scheduler 105 has a function of deciding a transmission power and a band to be allocated to the wireless terminal 200 from the allocatable wireless resources set in the storage unit by the wireless resource setting unit 104 and transmitting data in the transmission buffer 106 by a data signal based on the allocation result. At this time, MCS (Modulation and Coding Scheme) is decided based on CQI (Channel Quality Information) reported by the wireless terminal 200. As the MCS becomes higher, transmission at a higher transmission rate is possible.

The transmission buffer 106 has a function of accumulating data that has arrived from the network and is to be transmitted to the wireless terminal 200 together with management information such as an arrival time and a wireless terminal number for transmission.

The reference signal generation unit 107 has a function of transmitting a reference signal serving as a reference of communication path quality information from the base station operation unit 101 to the wireless terminal 200 at a predetermined timing.

The neighboring cell information notification unit 108 has a function of transmitting neighboring cell information such as a neighboring cell number from the base station operation unit 101 to the wireless terminal 200.

Out of the functional units of the wireless base station 100, some or all of the base station operation unit 101, the wireless terminal determination unit 102, the priority band setting unit 103, the wireless resource setting unit 104, the scheduler 105, the reference signal generation unit 107, and the neighboring cell information notification unit 108 may be implemented by an arithmetic processing unit formed by causing a CPU to execute programs. At this time, the programs are loaded from an external apparatus connected to the wireless base station 100 via a communication channel or a recording medium individually connected to the wireless base station 100 and stored in the storage unit in advance.

[Arrangement of Wireless Terminal]

The wireless terminal 200 includes a terminal operation unit 201 and a reception strength measurement unit 202 as main functional units.

The terminal operation unit 201 has the same functions as those of a wireless terminal generally used in a wireless communication system. The arrangement and operation are known, and a description thereof will be omitted.

The reception strength measurement unit 202 has a function of measuring communication path quality from a reference signal received from the wireless base station 100 and reporting it to the terminal operation unit 201 as communication path quality information.

In this exemplary embodiment, the reception strength measurement unit 202 has a function of measuring the RSRP and CQI of the local cell and the neighboring cell as communication path quality information based on the notification from the neighboring cell information notification unit 108. The CQI varies depending on the magnitude of interference from another cell. Hence, if the load on another cell is small, the CQI becomes high. The communication path quality information measured by the reception strength measurement unit 202 is transmitted from the terminal operation unit 201 to the wireless base station.

[Bands of Each Cell]

The bands of each cell provided in the wireless base station 100 will be described next with reference to FIGS. 3 and 4.

Figure 3:
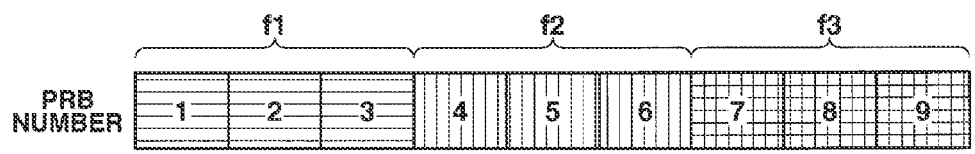
FIG. 3 is a view showing an example of wireless resource allocation.

As shown in FIG. 3, the priority band setting unit 103 of the cell C11 sets a band f1 when setting a priority band. Similarly, a cell C21 sets a band f2 as a priority band, and a cell C31 sets a band f3 as a priority band. Assume that three sector cells exist, and different priority bands can be set between the neighboring cells.

Figure 4:
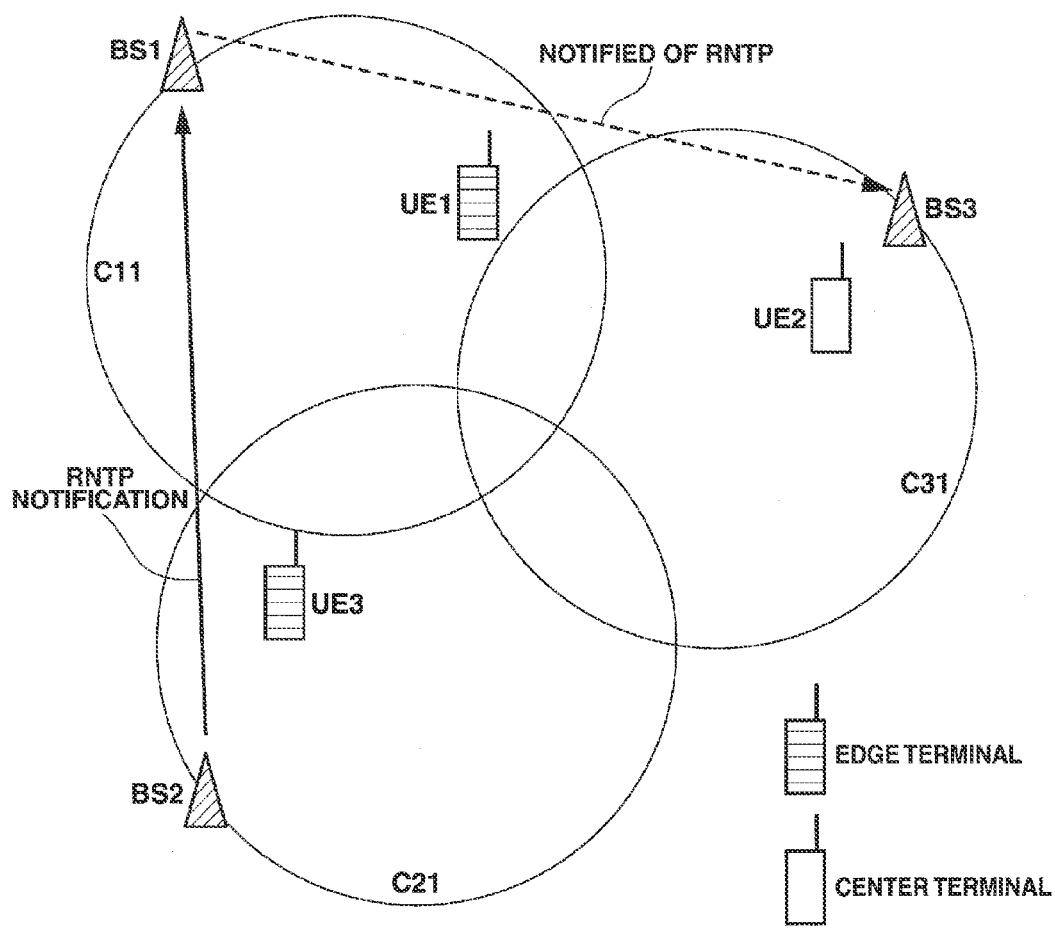
FIG. 4 is an explanatory view showing a wireless resource setting operation according to the exemplary embodiment.

As shown in FIG. 4, all bands allocatable to the cell C11 are defined as f_all=f1+f2+f3. Each of the bands f1, f2, and f3 includes three PRBs. For example, the band f1 includes three PRBs with PRB numbers 1, 2, and 3.

The transmission power is assumed to be settable for each wireless terminal. The same transmission power is assumed to be set for the same wireless terminal in the respective bands.

[Operation of First Exemplary Embodiment]

An operation of deciding an allocatable wireless resource will be described next as an operation of the wireless communication system according to this exemplary embodiment.

[Wireless Terminal Determination Processing]

Figure 5:
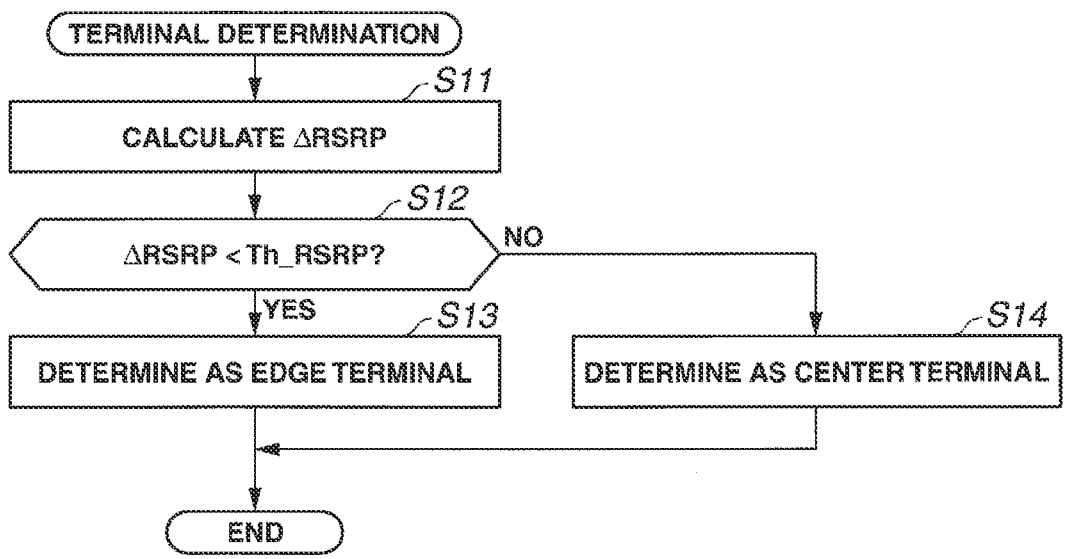
FIG. 5 is a flowchart showing wireless terminal determination processing.

The wireless terminal determination unit 102 determines, based on communication path quality reported by the wireless terminal u, whether the wireless terminal u is an edge wireless terminal or a center wireless terminal by wireless terminal determination processing shown in FIG. 5.

First, the wireless terminal determination unit 102 calculates a minimum value ΔRSRP [dB] of the RSRQ difference between the local cell and the neighboring cell (step S11).

Let RSRQ_serv(u) [dB] be the RSRQ of a local cell u, and RSRQ_neig(u, j) [dB] be the RSRQ of a neighboring cell j. The minimum value ΔRSRP(u) of the RSRQ difference between the local cell and the neighboring cell is obtained by $$\Delta RSRQ(u)=RSRQ\_serv(u)-\max\{RSRQ\_neig(u,j)\} \quad (1)$$

where max{ } is a function for selecting the maximum value.

Next, the wireless terminal determination unit 102 compares the obtained ΔRSRQ(u) with a threshold Th_RSRQ [dB] (step S12), as indicated by $$\Delta RSRQ(u)<Th\_RSRQ \quad (2)$$

If ΔRSRP is smaller than Th_RSRQ (YES in step S12), the reference signal received quality difference between the local cell and the neighboring cell is small. Hence, the wireless terminal u is determined to be an edge wireless terminal largely affected by neighboring cell interference (step S13).

On the other hand, if ΔRSRP equal to or larger than Th_RSRQ (NO in step S12), the wireless terminal u is determined to be a center wireless terminal less affected by neighboring cell interference (step S14).

[Neighboring Cell Priority Band Setting Processing]

Figure 6:
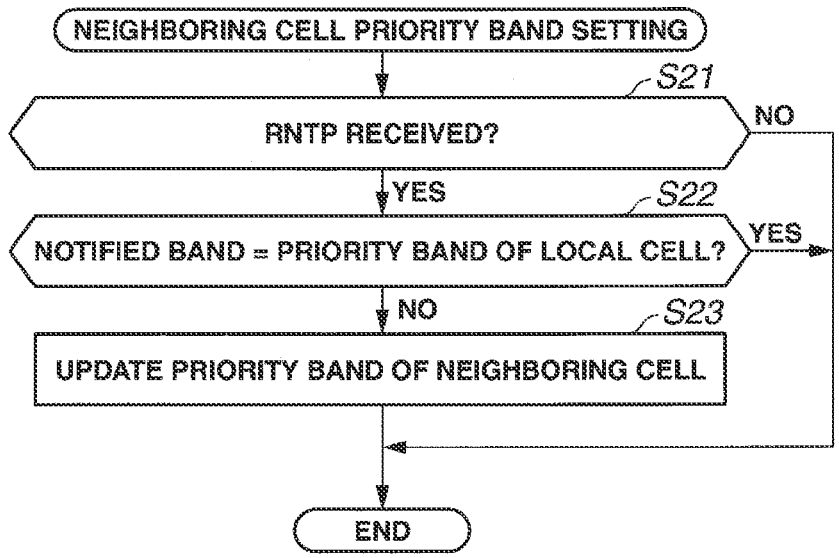
FIG. 6 is a flowchart showing neighboring cell priority band setting processing.

The priority band setting unit 103 executes neighboring cell priority band setting processing shown in FIG. 6 at a predetermined period.

First, the priority band setting unit 103 confirms whether RNTP has received from the neighboring cell within a predetermined time from preceding processing (step S21). If no RNTP has been received (NO in step S21), the priority band setting unit 103 ends the neighboring cell priority band setting processing.

On the other hand, if RNTP has been received (YES in step S21), the priority band setting unit 103 confirms whether the band notified by the RNTP is the priority band of the local cell (step S22).

If the band notified by the RNTP is not the priority band of the local cell (NO in step S22), the priority band setting unit 103 stores the band notified as RNTP=1 as the priority band of the neighboring cell (step S23), and ends the series of neighboring cell priority band setting processes.

If the band notified by the RNTP is the priority band of the local cell (YES in step S22), the priority band setting unit 103 ends the series of neighboring cell priority band setting processes without setting the priority band of the neighboring cell.

[Local Cell Priority Band Setting Processing]

Figure 7:
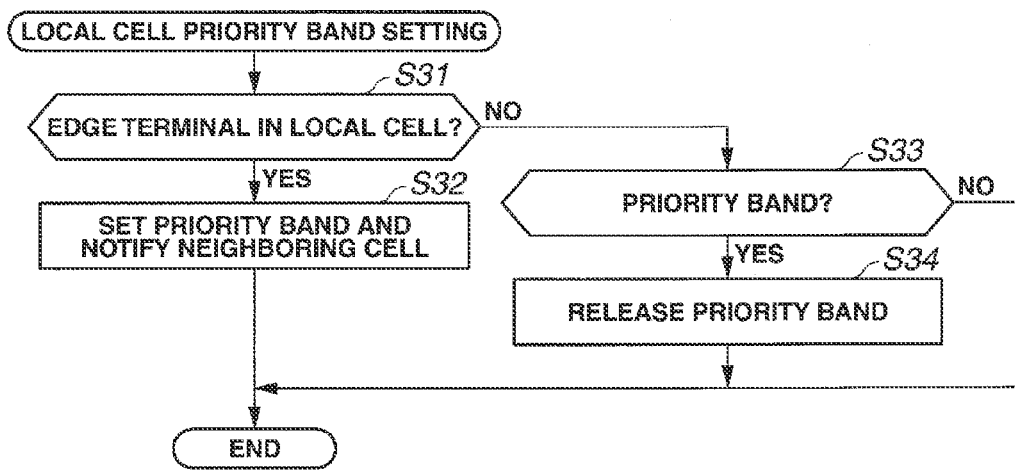
FIG. 7 is a flowchart showing local cell priority band setting processing.

The priority band setting unit 103 executes local cell priority band setting processing shown in FIG. 7 at a predetermined period.

First, the priority band setting unit 103 determines, based on the result of the wireless terminal determination unit 102, whether an edge wireless terminal exists in the local cell (step S31).

If an edge wireless terminal exists in the local cell (YES in step S31), the priority band setting unit 103 sets the band f1 as the priority band of the local cell, notifies the neighboring cell of the RNTP (step S32), and ends the series of local cell priority band setting processes.

On the other hand, if no edge wireless terminal exists in the local cell (NO in step S31), the priority band setting unit 103 determines whether the priority band has already been set (step S33).

If the priority band has already been set (YES in step S33), the priority band setting unit 103 releases the set priority band (step S34), and ends the series of local cell priority band setting processes. Releasing the priority band means not setting the priority band.

If the priority band has not been set (NO in step S33), the series of local cell priority band setting processes ends.

Note that in this exemplary embodiment, local cell priority band setting processing is not limited to this processing procedure, and for example, the priority band setting processing may be performed for each report of communication path quality information from a wireless terminal. In this exemplary embodiment, an example has been described in which the neighboring cell is notified of RNTP only when the priority band is set. However, the present invention is not limited to this, and for example, the neighboring cell may periodically be notified of RNTP.

Figure 8:
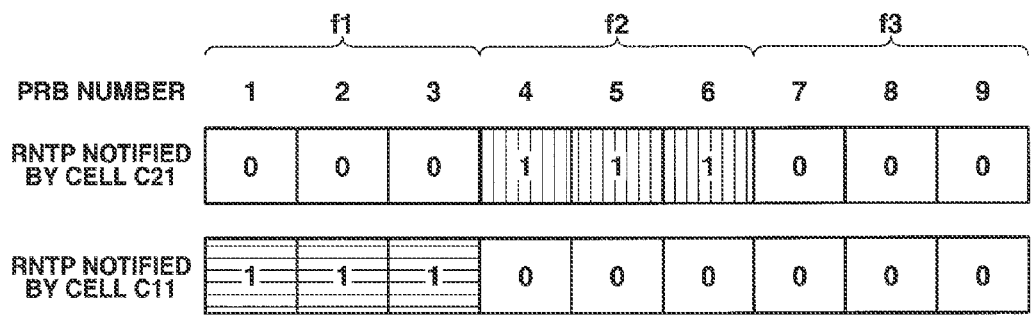
FIG. 8 is a view showing an example of an RNTP notification.

FIG. 8 shows an example of RNTP notified by the cell C11 and that notified by the neighboring cell C21 of the cell C11.

Since the priority band of the cell C11 is f1, the RNTP is set to 1 for the PRB numbers 1, 2, and 3. Since the priority band of the cell C21 is f2, the RNTP is set to 1 for the PRB numbers 4, 5, and 6, and the cell C21 notifies about it.

[Wireless Resource Setting Processing]

Figure 9:
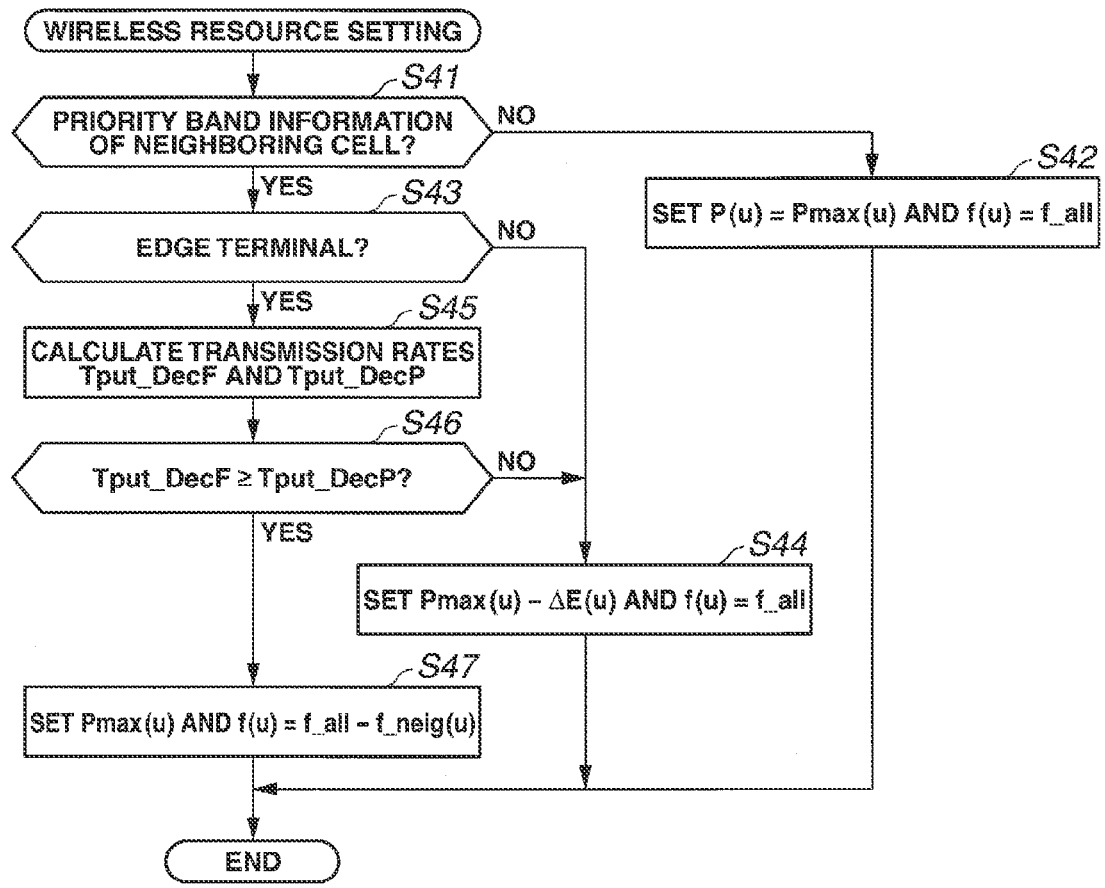
FIG. 9 is a flowchart showing wireless resource setting processing.

When setting a wireless resource allocatable to the wireless terminal u, the wireless resource setting unit 104 executes wireless resource setting processing shown in FIG. 9.

First, the wireless resource setting unit 104 determines whether the band set as the priority band of the neighboring cell is included in the bands allocatable to the cell C11 (step S41). If the band set as the priority band of the neighboring cell does not exist (NO in step S41), the wireless resource setting unit 104 sets the transmission power P(u)=Pmax(u) and the allocatable band f(u)=f_all=f1+f2+f3 (step S42), and ends the series of wireless resource setting processes. In this case, since interference to the neighboring cell need not be reduced, the transmission power is not decreased, and all bands are set as the allocatable bands.

On the other hand, if the band set as the priority band of the neighboring cell exists (YES in step S41), the wireless resource setting unit 104 determines whether the wireless terminal u is an edge wireless terminal (step S43). If the wireless terminal u is not an edge wireless terminal (NO in step S43), the wireless resource setting unit 104 sets the transmission power P(u)=Pmax(u)−ΔE(u), as shown in FIG. 10B, and the communication band f(u)=f_all as the wireless resource of the wireless terminal 200 (step S44), and ends the series of wireless resource setting processes. In this case, since the communication path quality is expected not to be low, the transmission power is decreased, and all bands are set to be allocatable instead. ΔE(u) is the electric energy to decrease.

If the wireless terminal u is an edge wireless terminal (YES in step S43), the wireless resource setting unit 104 calculates transmission rates Tput_DecF and Tput_DecP based on the communication path quality reported by the wireless terminal 200 (step S45). The method of calculating Tput_DecF and Tput_DecP will be described later.

Tput_DecF is a transmission rate (second transmission rate) expected when the transmission power is set to P(u)=Pmax(u) (second transmission power) without being decreased to maintain the communication path quality, and the allocatable bands are set to f(u)=f_all−f_neig(u) (second candidate bands) other than the priority band of the neighboring cell to reduce interference to the priority band of the neighboring cell.

In this case, f_neig represents the priority band notified by the neighboring cell. For example, since a wireless terminal UE1 shown in FIG. 4 is notified of f2 as the priority band by the cell C21, f_neig(u) is set to f2, that is, PRB numbers 4, 5, and 6. Hence, f(u) is f_all−f_neig=f1+f3.

On the other hand, Tput_DecP is a transmission rate (first transmission rate) expected when the transmission power is decreased and set to P(u)=Pmax(u)−ΔE(u) (first transmission power) to reduce interference to the priority band of the neighboring cell, and the allocatable bands are set to f(u)=f_all (first candidate bands) including the priority band of the neighboring cell to suppress degradation of throughput.

After that, the wireless resource setting unit 104 compares Tput_DecF with Tput_DecP (step S46). If Tput_DecF is equal to or higher than Tput_DecP (YES in step S46), the wireless resource setting unit 104 sets the transmission power P(u)=Pmax(u), as shown in FIG. 10A, and the communication band f(u)=f_all−f_neig(u) as the wireless resource of the wireless terminal 200 (step S47), and ends the series of wireless resource setting processes.

On the other hand, if Tput_DecF is lower than Tput_DecP (NO in step S46), the wireless resource setting unit 104 advances to step S44 to set the transmission power P(u)=Pmax(u)−ΔE(u), as shown in FIG. 10B, and the communication band f(u)=f_all as the wireless resource of the wireless terminal 200, and ends the series of wireless resource setting processes.

According to the wireless resource setting processing shown in FIG. 9, the combination of the transmission power P(u) and the communication band f(u) for a higher transmission rate can thus be set as a wireless resource allocatable to the wireless terminal u. It is therefore possible to maximize the throughput while suppressing interference to the priority band of the neighboring cell.

[Transmission Rate Calculation Processing]

The transmission rate calculation method executed by the wireless resource setting unit 104 in step S45 of the above-described wireless resource setting processing shown in FIG. 9 will be described next.

Assume that the MCS allocated to a single wireless terminal is common to the RBs. The transmission data size (TBS: Transport Block Size) can be calculated by looking up a lookup table using a TBS index and the number of allocated RBs (see, for example, non-patent literature 4).

The TBS index can uniquely be decided by looking up the lookup table (non-patent literature 4) using an MCS index. The MCS index can be calculated by looking up a lookup table using the effective SINR (Signal to Interference plus Noise Ratio) of the data signal. The effective SINR is the communication path quality of an allocated RB calculated in consideration of the variance or variation in SINR of each RB, and is acquired from the wireless terminal 200 via the base station operation unit 101. The lookup table is generally created by a link level simulation that simulates physical layers.

SINR (SINR_pdsch) [dB] of a data signal can be calculated by $$SINR\_pdsch(u)[dB]=SINR\_rs(u)[dB]+(P(u)-P\_rs) \quad (3)$$

SINR (SINR_rs) [dB] of a reference signal is calculated by looking up a lookup table using CQI. This lookup table is also generally created by a link level simulation that simulates physical layers. P_rs [dBm] represents the transmission power of the reference signal.

The transmission rate can be calculated using the CQI, the allocated candidate RBs (Cand_RBs), and the transmission power P(u).

An example of transmission rate calculation will be described next. Assuming Cand_RBs shown in FIG. 3, four calculation methods will be described using an example in which the wireless terminal u that is the transmission rate calculation target is the edge wireless terminal UE1 shown in FIG. 4.

As a precondition for each calculation method, all bands allocatable to the cell C11 where the edge wireless terminal UE1 exists are f_all=f1+f2+f3, as shown in FIG. 3, and the priority band notified by the neighboring cell is f_neig=f2. When the transmission rate is Tput_DecF, Pmax(u) is used as the transmission power P(u). When the transmission rate is Tput_DecP, Pmax(u)−ΔE(u) is used as the transmission power P(u). Note that the number of allocated candidate RBs is represented by N_Cand_RBs.

In the first calculation method, Wideband CQI is used as the CQI, and the allocatable bands are used as Cand_RBs.

In this case, the Wideband CQI represents communication path quality when transmission using all bands is performed. The CQI value is common to Tput_DecF and Tput_DecP. In Tput_DecF, Cand_RBs=f(u)=f_all−f_neig=f1+f3. Hence, N_Cand_RBs is 6. On the other hand, in Tput_DecP, since Cand_RBs=f(u)=f_all, N_Cand_RBs is 9.

In the second calculation method, Wideband CQI is used as the CQI, and the average number of allocated RBs (N_Ave_Alloc_RBs) of the wireless terminal is used as Cand_RBs.

In this case, N_Ave_Alloc_RBs is calculated as an arithmetic mean in a predetermined section using a past allocation result. The averaging method may be another method such as weighted averaging.

Assume that it is determined that Tput_DecF is higher, and N_Ave_Alloc_RBs of a wireless terminal for which P(u)= Pmax(u) and f(u)=f_all−f_neig(u) are set is N_Ave_Alloc_RBs_DecF. In addition, assume that it is determined that Tput_DecP is higher, and N_Ave_Alloc_RBs of a wireless terminal for which P(u)=Pmax(u)−ΔE(u) and f(u)=f_all are set is N_Ave_Alloc_RBs_DecP.

At this time, N_Cand_RBs is calculated by $$N\_Use\_RBs = \text{floor}(N\_Ave\_Alloc\_RBs) \tag{4}$$

where floor( ) is a function for returning an integer value by discarding all digits to the right of the decimal point.

According to equation (4), for example, when N_Ave_Alloc_RBs_DecF=2.1, and N_Ave_Alloc_RBs_DecP=4.3, N_Cand_RBs are 2 and 4, respectively.

According to the second calculation method, although the processing load increases to calculate N_Ave_Alloc_RBs, as compared to the first calculation method, a value close to the actual transmission rate expected at the time of scheduling can be estimated.

In the third calculation method, Wideband CQI is used as the CQI, and out of bands allocatable to Cand_RBs, unallocated RBs that are not allocated to any wireless terminal are used in accordance with the allocation condition of the scheduler 105.

Assume that the PRB numbers=3, 6, and 7 represented by the hatched portions in FIG. 11 are already allocated. At this time, when the transmission rate is Tput_DecF, the allocatable bands are f(u)=f_all. Hence, the PRB numbers of actually allocatable RBs are 1, 2, 4, 5, 8, and 9, and N_Cand_RBs is 6.

On the other hand, when the transmission rate is Tput_DecP, the allocatable bands are f(u)=f_all−f_neig. Hence, the PRB numbers of actually allocatable RBs are 1, 2, 8, and 9, and N_Ave_Alloc_RBs is 4.

According to the third calculation method, when the calculation is executed for every scheduling period, a wireless resource for a high transmission rate can properly be allocated. For this reason, the throughput can be maximized, though the processing load further increases. This method is assumed to be applied to a system capable of changing the transmission power for every scheduling period.

In the fourth calculation method, Narrowband CQI is used as the CQI, and out of bands allocatable to Cand_RBs, unallocated RBs are used in accordance with the allocation condition of the scheduler 105.

In this case, Narrowband CQI represents communication path quality when transmission using one or more predetermined continuous RBs is performed, that is, the communication path quality in some bands. When the Narrowband CQI is used, the effective SINR calculation accuracy is improved. Hence, the transmission rate calculation accuracy is also improved.

[Effects of First Exemplary Embodiment]

As described above, in this exemplary embodiment, the wireless base station 100 calculates the first transmission rate when performing transmission to the wireless terminal 200 with the communication path quality by the first transmission power in the first candidate band selected as a candidate from the first wireless bands including the neighboring priority band out of wireless bands usable in the local station communication area, calculates the second transmission rate when performing transmission to the wireless terminal with the communication path quality by the second transmission power in the second candidate band selected as a candidate from the second wireless bands that do not include the neighboring priority band out of the wireless bands usable in the local station communication area, and sets, out of the first wireless resource including the first transmission power and the first candidate band and the second wireless resource including the second transmission power and the second candidate band, the wireless resource for a higher transmission rate obtained by the calculation as a wireless resource allocatable to the wireless terminal 200.

Hence, out of the first wireless resource including a band that is so wide as to cause interference to the neighboring priority band and a transmission power that is suppressed to reduce interference and the second wireless resource including a band that is so narrow as not to cause interference to the neighboring priority band and a high transmission power, a wireless resource capable of obtaining a higher transmission rate can be set as a wireless resource allocatable to the wireless terminal 200. It is therefore possible to maximize the throughput of the wireless terminal 200 existing in the local station communication area while implementing suppression of interference to the neighboring cell.

In this exemplary embodiment, a transmission power larger than the first transmission power may be used as the second transmission power.

In this exemplary embodiment, a transmission band to be used for transmission from the wireless base station 100 to the wireless terminal 200 may be used as a candidate band.

In this exemplary embodiment, the candidate band may be calculated from the average value of bandwidths allocated to the wireless terminal 200 in the past.

In this exemplary embodiment, a band that is not allocated to any wireless terminal at the time of transmission rate calculation may be used as a candidate band.

In this exemplary embodiment, communication path quality concerning all wireless bands usable in the local station communication area may be used as the communication path quality.

In this exemplary embodiment, communication path quality concerning some of the wireless bands usable in the local station communication area may be used as the communication path quality.

In this exemplary embodiment, since LTE is assumed, the MCS allocated to a single wireless terminal is common to the RBs. However, the present invention is not limited to this. When the present invention is applied to another wireless communication system, the transmission rate may be calculated assuming different MCSs for the respective RBs.

Additionally, in the present invention, since LTE is assumed, the same transmission power is applied to a single wireless terminal for each band. However, the present invention is not limited to this. When the present invention is applied to another wireless communication system, the transmission power may be changed for each allocated band.

In this exemplary embodiment, the RSRP difference between the local cell and the neighboring cell is used to determine the edge wireless terminal. However, the present invention is not limited to this. For example, the ratio (RSRQ: Reference Signal Received Quality) of all received power to the reference signal received power may be used. Alternatively, the ratio (SINR) of the interference power and noise power to the reference signal received power may be used.

Otherwise, a path loss calculated from the difference between the reference signal received power and the transmission power may be used. The signal to measure the received power is not limited to the reference signal and may be a notification signal.

[Second Exemplary Embodiment]

A wireless communication system 1 according to the second exemplary embodiment of the present invention will be described next.

This exemplary embodiment is different from the first exemplary embodiment in that when a wireless resource setting unit 104 sets a wireless resource, whether a wireless terminal is an edge wireless terminal is not determined, and the processing aims at both the edge wireless terminal and the center wireless terminal. The rest of the arrangement of the wireless communication system according to this exemplary embodiment is the same as in the first exemplary embodiment, and a detailed description thereof will be omitted here.

[Operation of Second Exemplary Embodiment]

The operation of the wireless communication system 1 according to this exemplary embodiment will be described next with reference to FIG. 12.

Figure 12:
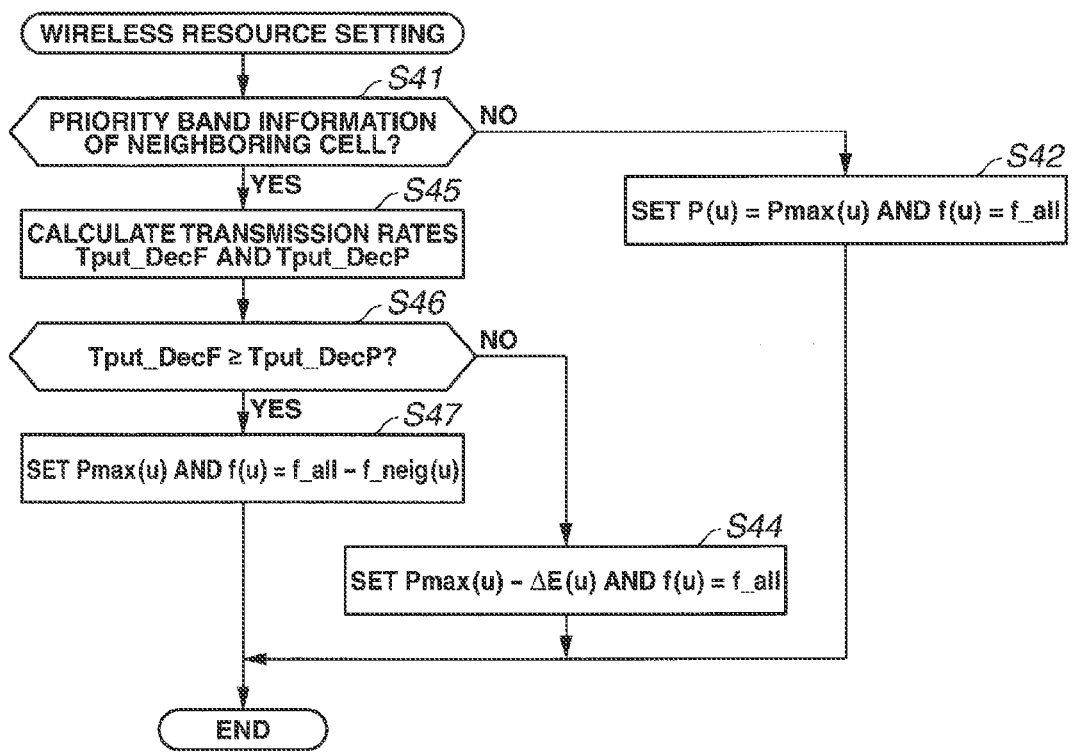
FIG. 12 is a flowchart showing wireless resource setting processing of a wireless communication system 1 according to the second exemplary embodiment.

When setting a wireless resource allocatable to a wireless terminal u, the wireless resource setting unit 104 executes wireless resource setting processing shown in FIG. 12.

First, the wireless resource setting unit 104 determines whether the band set as the priority band of the neighboring cell is included in the bands allocatable to a cell C11 (step S41). If the band set as the priority band of the neighboring cell does not exist (NO in step S41), the wireless resource setting unit 104 sets a transmission power P(u)=Pmax(u) and an allocatable band f(u)=f_all=f1+f2+f3 (step S42), and ends the series of wireless resource setting processes. In this case, since interference to the neighboring cell need not be reduced, the transmission power is not decreased, and all bands are set as the allocatable bands.

On the other hand, if the band set as the priority band of the neighboring cell exists (YES in step S41), the wireless resource setting unit 104 calculates transmission rates Tput_DecF and Tput_DecP based on communication path quality reported by a wireless terminal 200 independently of whether the wireless terminal u is an edge wireless terminal (step S45).

After that, the wireless resource setting unit 104 compares Tput_DecF with Tput_DecP (step S46). If Tput_DecF is equal to or higher than Tput_DecP (YES in step S46), the wireless resource setting unit 104 sets the transmission power P(u)=Pmax(u), as shown in FIG. 10A, and the communication band f(u)=f_all−f_neig(u) as the wireless resource of the wireless terminal 200 (step S47), and ends the series of wireless resource setting processes.

On the other hand, if Tput_DecF is lower than Tput_DecP (NO in step S46), the wireless resource setting unit 104 advances to step S44 to set the transmission power P(u)=Pmax(u)−ΔE(u), as shown in FIG. 10B, and the communication band f(u)=f_all as the wireless resource of the wireless terminal 200, and ends the series of wireless resource setting processes.

According to the wireless resource setting processing shown in FIG. 12, the combination of the transmission power P(u) and the communication band f(u) for a higher transmission rate can thus be set as a wireless resource allocatable to the wireless terminal u independently of whether the wireless terminal is an edge wireless terminal. It is therefore possible to further improve the throughput while suppressing interference to the priority band of the neighboring cell.

[Third Exemplary Embodiment]

Figure 13:
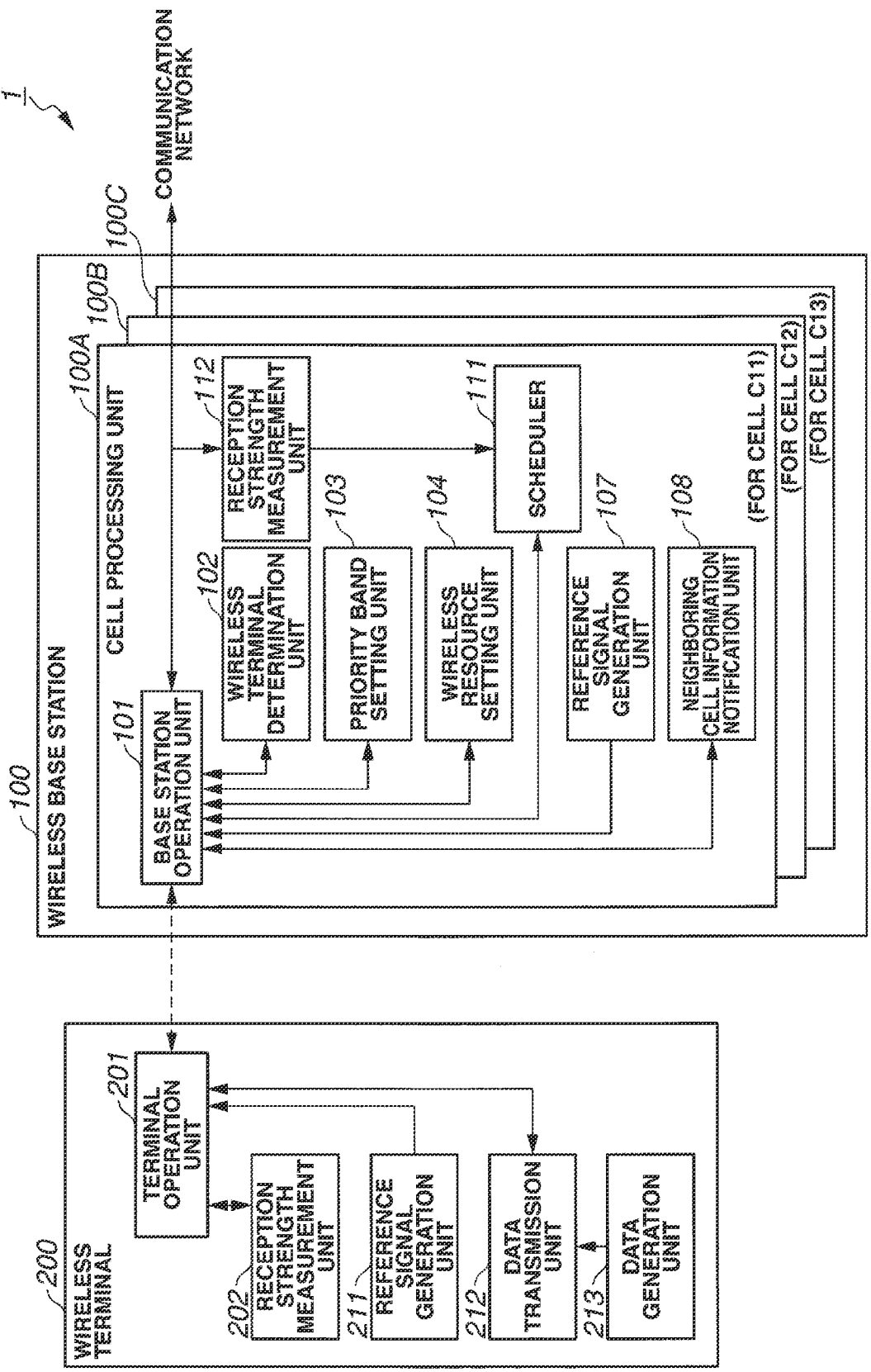
FIG. 13 is a block diagram showing the arrangement of a wireless communication system according to the third exemplary embodiment.
Figure 14:
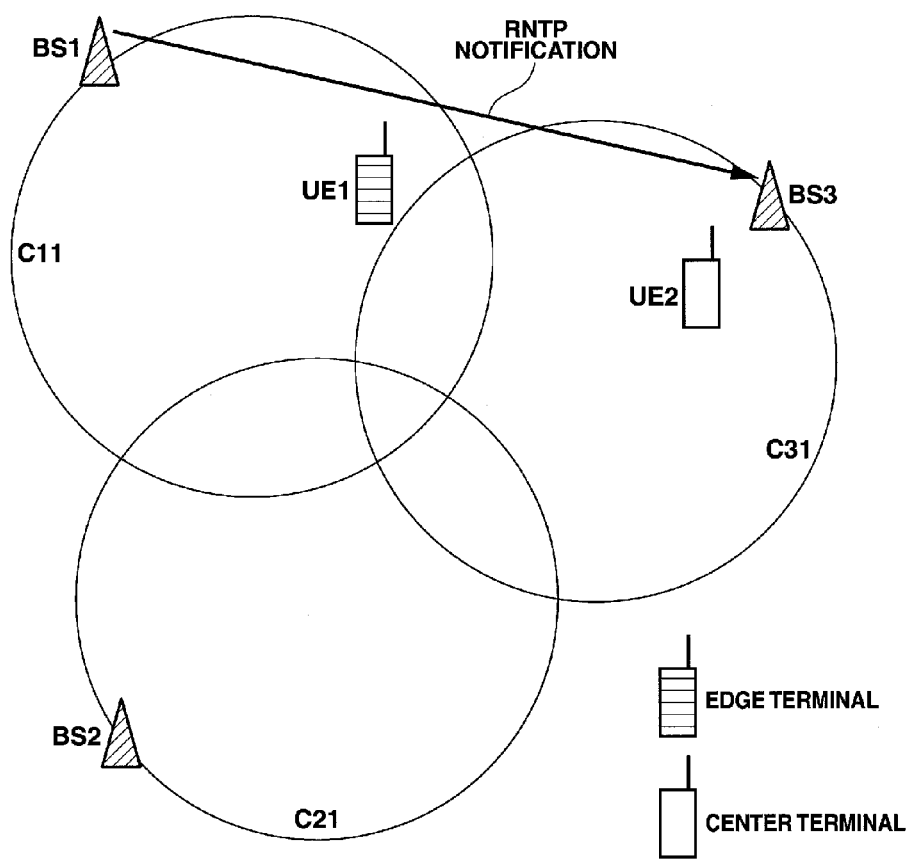
FIG. 14 is an explanatory view showing a wireless resource setting operation of a related art.
Figure 15:
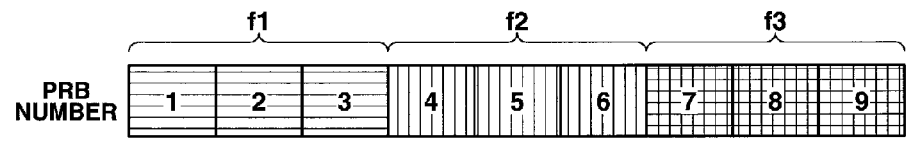
FIG. 15 is a view showing an example of priority band allocation.
Figure 16A:
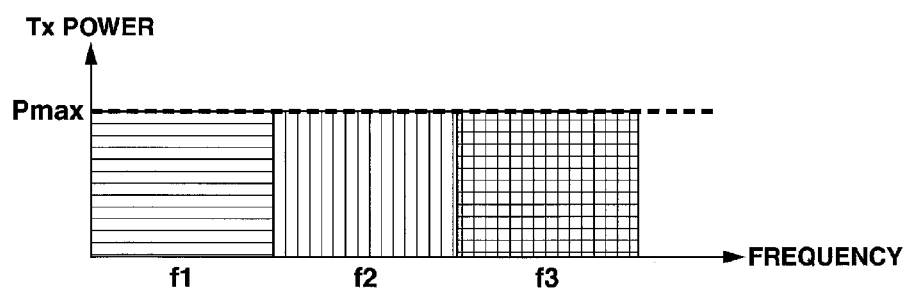
FIG. 16A is a view showing an example of setting of wireless resources allocatable to a wireless terminal UE1.
Figure 16B:
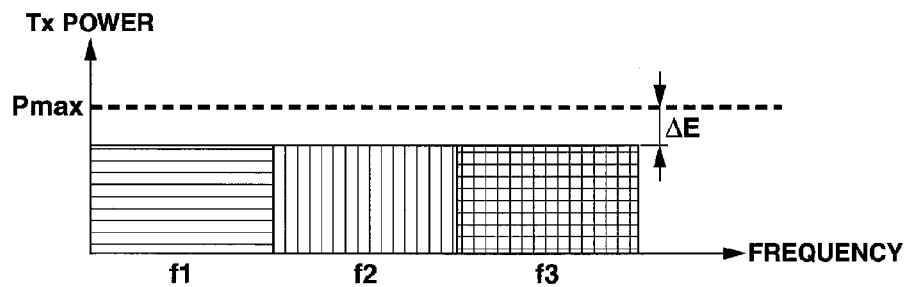
FIG. 16B is a view showing an example of setting of wireless resources allocatable to a wireless terminal UE2.
Figure 17:
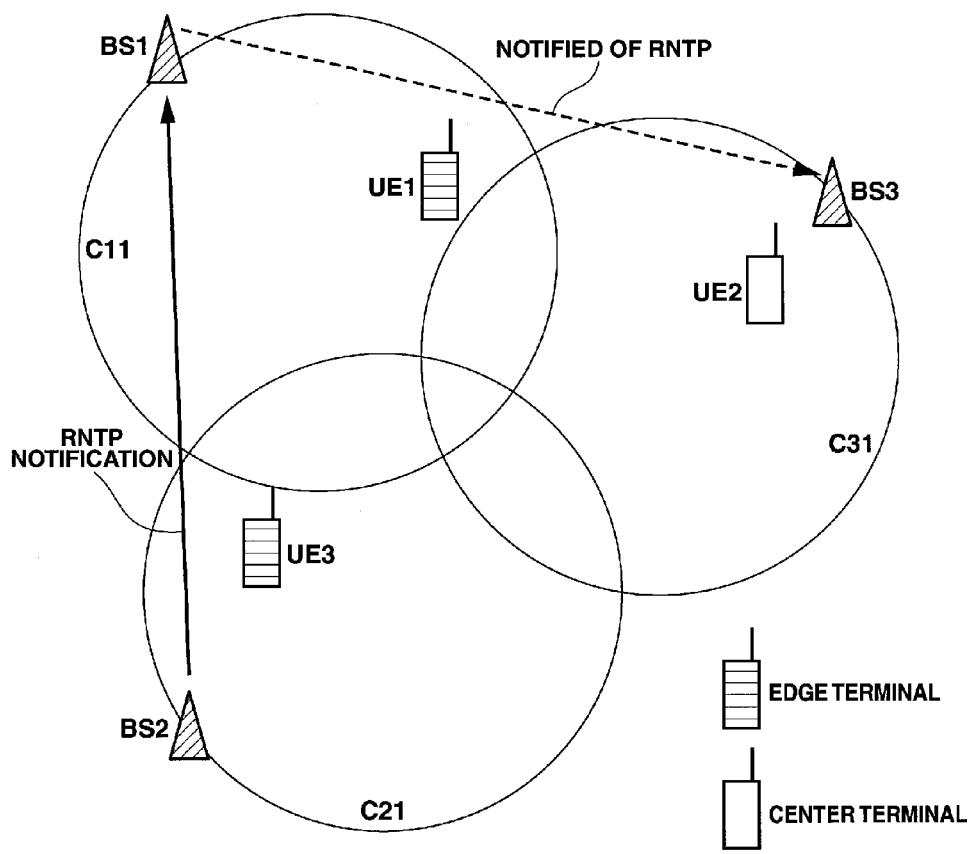
FIG. 17 is an explanatory view showing a wireless resource setting operation after a time has elapsed from FIG. 14.
Figure 18:
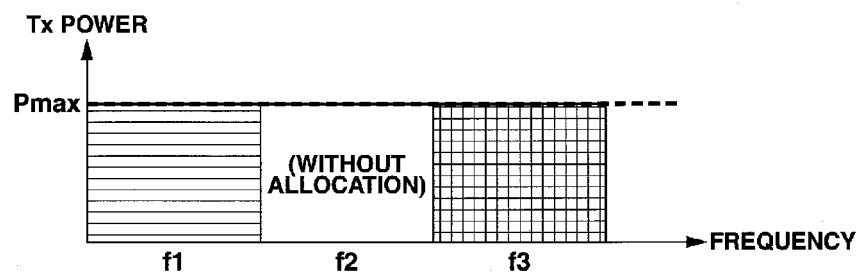
FIG. 18 is a view showing an example of setting of wireless resources allocatable to the wireless terminal UE1 (after RNTP reception).

A wireless communication system 1 according to the third exemplary embodiment of the present invention will be described next with reference to FIG. 13.

A wireless base station 100 of the wireless communication system 1 according to this exemplary embodiment is provided with a scheduler 111 in place of the scheduler 105 and a reception strength measurement unit 112 in place of the transmission buffer 106, as compared to the first exemplary embodiment.

A wireless terminal 200 of the wireless communication system 1 according to this exemplary embodiment additionally includes a reference signal generation unit 211, a data transmission unit 212, and a data generation unit 213, as compared to the first exemplary embodiment.

The scheduler 111 has a function of deciding a wireless resource to be allocated to the wireless terminal 200 from allocatable wireless resources set by a wireless resource setting unit 104 and transmitting scheduling information to the wireless terminal 200 based on the allocation result. At this time, MCS to be used to calculate a transmission rate is decided based on communication path quality measured by the reception strength measurement unit 112.

The reception strength measurement unit 112 has a function of measuring communication path quality from a reference signal received from the wireless terminal 200.

The reference signal generation unit 211 has a function of transmitting a reference signal to be used to measure the communication path quality serving as a reference of MCS to be allocated by the scheduler 111 from the terminal operation unit 201 to the wireless base station 100 at a predetermined timing.

The data transmission unit 212 has a function of transmitting data from the data generation unit 213 to the wireless base station based on the scheduling information received from the wireless base station 100.

The data generation unit 213 has a function of generating data to be transmitted from the wireless terminal 200 and accumulating it together with management information such as a generation time.

[Operation of Third Exemplary Embodiment]

The operation of the wireless communication system 1 according to this exemplary embodiment will be described next with reference to FIG. 9. Wireless resource setting processing executed by the wireless communication system 1 according to this exemplary embodiment is the same as that of the first exemplary embodiment described above with reference to FIG. 9 except transmission rate calculation processing.

That is, a wireless resource setting unit 104 according to this exemplary embodiment uses, as the effective SINR to be used to calculate an MCS index, communication path quality concerning the reception band used for reception from the wireless terminal 200 to the wireless base station 100, which is measured by the reception strength measurement unit 112.

[Effect of Third Exemplary Embodiment]

As described above, in this exemplary embodiment, the wireless base station 100 is provided with the reception strength measurement unit 112 that measures communication path quality from the reference signal from the wireless terminal 200. The wireless resource setting unit 104 calculates the first transmission rate (Tput_DecP) and the second transmission rate (Tput_DecF) based on the communication path quality measured by the reception strength measurement unit 112. Hence, a combination of a transmission power and exemplary communication band for a higher transmission rate can be set as a wireless resource allocable to the wireless terminal 200 on the up link from the wireless terminal 200 to the wireless base station 100.

[Extension of Exemplary Embodiments]

The present invention has been described above with reference to the exemplary embodiments. However, the present invention is not limited to the above exemplary embodiments. Various changes and modifications understandable by those who are skilled in the art can be done for the arrangements and details of the present invention without departing the scope of the present invention.

In addition, each exemplary embodiment is not limited to the above-described wireless communication system and can also be applied to another wireless communication system using, for example, FDMA (Frequency Division Multiple Access) that applies frequency multiplex.

[Supplementary Notes]

The characteristic features of the present invention will be described below.

(Supplementary Note 1)

A wireless resource setting method comprises:

the priority band acquisition step of acquiring, based on a notification from a neighboring wireless base station in a neighboring communication area next to a local station communication area of a wireless base station, a neighboring priority band preferentially used in the neighboring communication area;

the communication path quality acquisition step of acquiring, based on a notification from a wireless terminal existing in the local station communication area, communication path quality concerning wireless communication of the wireless terminal with the wireless base station;

the transmission rate calculation step of calculating a first transmission rate when performing transmission to the wireless terminal with the communication path quality by a first transmission power in a first candidate band selected as a candidate from first wireless bands including the neighboring priority band out of wireless bands usable in the local station communication area and calculating a second transmission rate when performing transmission to the wireless terminal with the communication path quality by a second transmission power in a second candidate band selected as a candidate from second wireless bands that do not include the neighboring priority band out of the wireless bands usable in the local station communication area; and the wireless resource setting step of setting, out of a first wireless resource including the first transmission power and the first candidate band and a second wireless resource including the second transmission power and the second candidate band, a wireless resource for a higher transmission rate obtained by the calculation as a wireless resource allocatable to the wireless terminal.

(Supplementary Note 2)

In a wireless resource setting method according to supplementary note 1, the second transmission power is larger than the first transmission power.

(Supplementary Note 3)

In a wireless resource setting method according to supplementary note 1 or 2, the candidate band includes a transmission band to be used for transmission from the wireless base station to the wireless terminal.

(Supplementary Note 4)

In a wireless resource setting method according to supplementary note 1 or 2, the candidate band is calculated from an average value of bandwidths allocated to the wireless terminal in the past.

(Supplementary Note 5)

In a wireless resource setting method according to supplementary note 1 or 2, the candidate band includes a band that is not allocated to any wireless terminal at a time of transmission rate calculation.

(Supplementary Note 6)

In a wireless resource setting method according to any one of supplementary notes 1 to 5, the communication path quality concerns all the wireless bands usable in the local station communication area.

(Supplementary Note 7)

In a wireless resource setting method according to any one of supplementary notes 1 to 5, the communication path quality concerns some of the wireless bands usable in the local station communication area.

(Supplementary Note 8)

A wireless communication system comprises a wireless base station and a wireless terminal existing in a local station communication area of the wireless base station, the wireless base station comprising:

a priority band acquisition unit that acquires, based on a notification from a neighboring wireless base station in a neighboring communication area next to the local station communication area, a neighboring priority band preferentially used in the neighboring communication area;

a communication path quality acquisition unit that acquires, based on a notification from the wireless terminal, communication path quality concerning wireless communication of the wireless terminal with the wireless base station;

a transmission rate calculation unit that calculates a first transmission rate when performing transmission to the wireless terminal with the communication path quality by a first transmission power in a first candidate band selected as a candidate from first wireless bands including the neighboring priority band out of wireless bands usable in the local station communication area and calculates a second transmission rate when performing transmission to the wireless terminal with the communication path quality by a second transmission power in a second candidate band selected as a candidate from second wireless bands that do not include the neighboring priority band out of the wireless bands usable in the local station communication area; and a wireless resource setting unit that sets, out of a first wireless resource including the first transmission power and the first candidate band and a second wireless resource including the second transmission power and the second candidate band, a wireless resource for a higher transmission rate obtained by the calculation as a wireless resource allocatable to the wireless terminal.

(Supplementary Note 9)

A wireless base station comprises:

a priority band acquisition unit that acquires, based on a notification from a neighboring wireless base station in a neighboring communication area next to a local station communication area of the wireless base station, a neighboring priority band preferentially used in the neighboring communication area;

a communication path quality acquisition unit that acquires, based on a notification from a wireless terminal existing in the local station communication area, communication path quality concerning wireless communication of the wireless terminal with the wireless base station;

a transmission rate calculation unit that calculates a first transmission rate when performing transmission to the wireless terminal with the communication path quality by a first transmission power in a first candidate band selected as a candidate from first wireless bands including the neighboring priority band out of wireless bands usable in the local station communication area and calculates a second transmission rate when performing transmission to the wireless terminal with the communication path quality by a second transmission power in a second candidate band selected as a candidate from second wireless bands that do not include the neighboring priority band out of the wireless bands usable in the local station communication area; and a wireless resource setting unit that sets, out of a first wireless resource including the first transmission power and the first candidate band and a second wireless resource including the second transmission power and the second candidate band, a wireless resource for a higher transmission rate obtained by the calculation as a wireless resource allocatable to the wireless terminal.

(Supplementary Note 10)

There is provided a program that causes a computer to function as each unit included in a wireless base station of supplementary note 9.

Explanation Of The Reference Numerals And Signs

1 . . . wireless communication system, 100 . . . wireless base station, 100A, 100B, 100C . . . cell processing unit, 101 . . . base station operation unit, 102 . . . wireless terminal determination unit, 103 . . . priority band setting unit, 104 . . . wireless resource setting unit, 105, 111 . . . scheduler, 106 . . . transmission buffer, 107 . . . reference signal generation unit, 108 . . . neighboring cell information notification unit, 112 . . . reception strength measurement unit, 200 . . . wireless terminal, 201 . . . terminal operation unit, 202 . . . reception strength measurement unit, 211 . . . reference signal generation unit, 212 . . . data transmission unit, 213 . . . data generation unit

The invention claimed is:

1. A wireless resource setting method comprising:

the priority band acquisition step of acquiring, based on a notification from a neighboring wireless base station in a neighboring communication area next to a local station communication area of a wireless base station, a neighboring priority band preferentially used in the neighboring communication area;

the communication path quality acquisition step of acquiring, based on a notification from a wireless terminal existing in the local station communication area, communication path quality concerning wireless communication of the wireless terminal with the wireless base station;

the transmission rate calculation step of calculating a first transmission rate when performing transmission to the wireless terminal with the communication path quality by a first transmission power in a first candidate band selected as a candidate from first wireless bands including the neighboring priority band out of wireless bands usable in the local station communication area and calculating a second transmission rate when performing transmission to the wireless terminal with the communication path quality by a second transmission power in a second candidate band selected as a candidate from second wireless bands that do not include the neighboring priority band out of the wireless bands usable in the local station communication area; and the wireless resource setting step of setting, out of a first wireless resource including the first transmission power and the first candidate band and a second wireless resource including the second transmission power and the second candidate band, a wireless resource for a higher transmission rate obtained by the calculation as a wireless resource allocatable to the wireless terminal.

2. A wireless resource setting method according to claim 1, wherein the second transmission power is larger than the first transmission power.

3. A wireless resource setting method according to claim 1, wherein the candidate band includes a transmission band to be used for transmission from the wireless base station to the wireless terminal.

4. A wireless resource setting method according to claim 1, wherein the candidate band is calculated from an average value of bandwidths allocated to the wireless terminal in the past.

5. A wireless resource setting method according to claim 1, wherein the candidate band includes a band that is not allocated to any wireless terminal at a time of transmission rate calculation.

6. A wireless resource setting method according to claim 1, wherein the communication path quality concerns all the wireless bands usable in the local station communication area.

7. A wireless resource setting method according to claim 1, wherein the communication path quality concerns some of the wireless bands usable in the local station communication area.

8. A wireless communication system comprising a wireless base station and a wireless terminal existing in a local station communication area of the wireless base station, said wireless base station comprising:

a priority band acquisition unit that acquires, based on a notification from a neighboring wireless base station in a neighboring communication area next to the local station communication area, a neighboring priority band preferentially used in the neighboring communication area;

a communication path quality acquisition unit that acquires, based on a notification from said wireless terminal, communication path quality concerning wireless communication of said wireless terminal with said wireless base station;

a transmission rate calculation unit that calculates a first transmission rate when performing transmission to said wireless terminal with the communication path quality by a first transmission power in a first candidate band selected as a candidate from first wireless bands including the neighboring priority band out of wireless bands usable in the local station communication area and calculates a second transmission rate when performing transmission to said wireless terminal with the communication path quality by a second transmission power in a second candidate band selected as a candidate from second wireless bands that do not include the neighboring priority band out of the wireless bands usable in the local station communication area; and a wireless resource setting unit that sets, out of a first wireless resource including the first transmission power and the first candidate band and a second wireless resource including the second transmission power and the second candidate band, a wireless resource for a higher transmission rate obtained by the calculation as a wireless resource allocatable to said wireless terminal.

9. A wireless base station comprising:

a priority band acquisition unit that acquires, based on a notification from a neighboring wireless base station in a neighboring communication area next to a local station communication area of the wireless base station, a neighboring priority band preferentially used in the neighboring communication area;

a communication path quality acquisition unit that acquires, based on a notification from a wireless terminal existing in the local station communication area, communication path quality concerning wireless communication of the wireless terminal with the wireless base station;

a transmission rate calculation unit that calculates a first transmission rate when performing transmission to the wireless terminal with the communication path quality by a first transmission power in a first candidate band selected as a candidate from first wireless bands including the neighboring priority band out of wireless bands usable in the local station communication area and calculates a second transmission rate when performing transmission to the wireless terminal with the communication path quality by a second transmission power in a second candidate band selected as a candidate from second wireless bands that do not include the neighboring priority band out of the wireless bands usable in the local station communication area; and a wireless resource setting unit that sets, out of a first wireless resource including the first transmission power and the first candidate band and a second wireless resource including the second transmission power and the second candidate band, a wireless resource for a higher transmission rate obtained by the calculation as a wireless resource allocatable to the wireless terminal.

* * * * *